Dec. 28, 1926.
A. TURNER
1,612,774
MACHINE TOOL
Filed Oct. 24, 1924
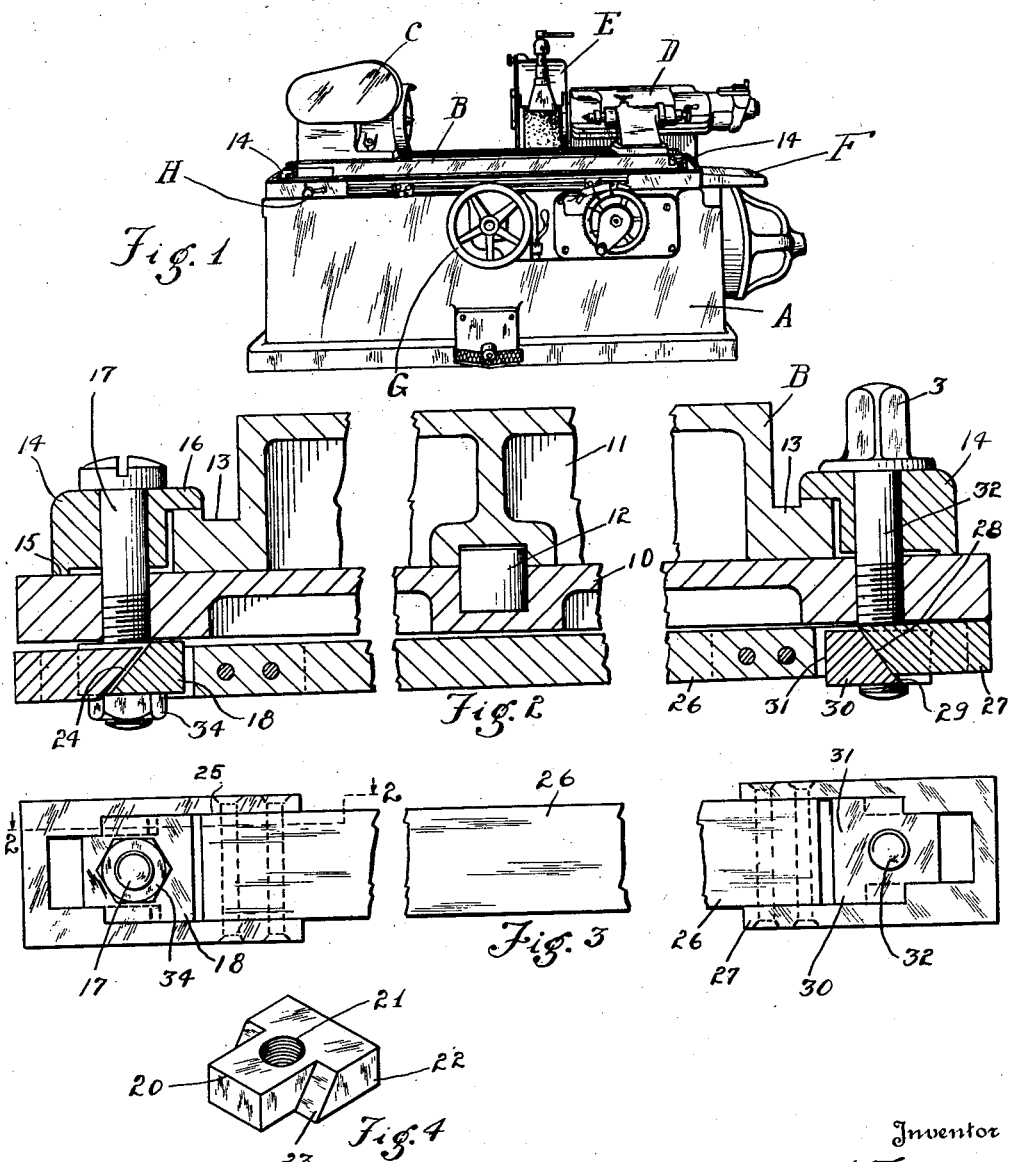
Inventor
Albert Turner
By A. K. Parsons
Attorney Patented Dec. 28, 1926.

1,612,774

UNITED STATES PATENT OFFICE.

ALBERT TURNER, OF CINCINNATI, OHIO, ASSIGNOR TO THE CINCINNATI MILLING MACHINE COMPANY, OF CINCINNATI, OHIO, A CORPORATION OF OHIO.

MACHINE TOOL.

Application filed October 24, 1924. Serial No. 745,672.

This invention relates to improvements in machine tools and has particular reference to improved mechanism for satisfactorily securing relatively shiftable portions of a machine tool any desired adjusted position.

One of the objects of the present invention is the provision of novel and improved locking mechanisms which shall be readily accessible and will facilitate satisfactorily securing of the relatively movable parts at a plurality of points thru the medium of a single adjustment. A further object of the invention is the provision of a structure in which the clamping or securing mechanisms shall be both independently and simultaneously adjustable.

Another object of the invention is the provision of a mechanism which shall insure proper rigid clamping together of the relatively adjustable parts of the machine and prevent undue play due to carelessness or inattention on the part of the operator.

Other objects and advantages of the present invention should be readily apparent by reference to the following specification taken in connection with the accompanying drawings forming a part thereof and it will be understood that I will make any modifications in the specific details of construction shown and described within the scope of the appended claims without departing from or exceeding the spirit of the invention.

Figure 1 represents a front view of one form of machine tool embodying my invention.

Figure 2 represents a longitudinal sectional view illustrating the locking mechanism therefor.

Figure 3 represents a fragmentary plan view of the ends of the locking bar and

Figure 4 a perspective view of one of the adjusting nuts.

The present invention is designed for application to any form of machine tool or the like, in which there is a relative adjustment of parts which for best results should be subsequently securely clamped or held together at a plurality of points. For the purpose of illustration it has been shown as employed in connection with a center grinder. This grinder comprises the base or bed A having the table portion B bearing the headstock C and tailstock D. Mounted on the bed is a suitable grinding wheel E for operation upon the work.

In the particular form shown, the table B is slidably mounted on the bed for movement longitudinally thereof on the ways F. Sliding movement is imparted thereto as by the hand-wheel G, and suitable means, as H are provided to lock it in adjusted position. The table includes a slidable, non-rotatable portion 10 and an upper portion 11 movable therewith and angularly adjustable with respect thereto. These parts are centrally connected for relative rotative movement as by the trunnion or pivot stud 12 and the portion 11 has the laterally extending flanges 13 for engagement by the clamps 14.

By reference to Figure 1 it will be noted that the general controls for the machine are disposed at the right hand end thereof with the result that the operator normally assumes his position at the right hand end of the machine for controlling its operation and in some instances will neglect to move to the left hand end of the machine to properly tighten the left hand clamps upon angular adjustment of the portion 11 of the table.

The primary purpose of the present invention, therefore, is to provide a mechanism which will automatically tighten both sets of clamps simultaneously and thus obviate difficulties formerly experienced due to carelessness of the operator as well as facilitating adjustment of the machine and saving time in connection with the operation thereof. A further purpose is to provide a mechanism of such character that it will readily move with a sliding table without interference with the adjustment thereof and satisfactorily equalize and adjust the clamping pressures used to secure a swiveled or relatively adjustable member in position on the slide.

As it will be best understood by reference to Figure 2, the left hand clamp member is shown as fulcrumed on the table 11 as at 15 and having overhanging portion 16 clampingly engaging flange 13. Extending downwardly through clamp 14 intermediate portions 15 and 16 and projecting through portion 10 of the table is the clamp bolt or stud 17 having engaged on its lower end a nut 18 adapted to bear against the underside of the table portion 10.

This nut is of the general form illustrated in Figure 4 having a substantially square central portion 20 provided with the threaded bolt receiving aperture 21 and with the laterally extending wing portions 22, having the upper beveled or inclined surfaces 23. These surfaces are designed for cooperation with the inclined or wedge faces 24 of adjusting yoke 25 carried by bar 26. At its opposite end, bar 26 is provided with a second yoke 27, having inclined or wedge faces 28 for cooperation with the surfaces 29 on wings 30 of clamp nut 31. This nut 31 is engaged on the lower end of bolt 32 which extends above the right hand clamp 14 as illustrated and is provided with a square or other suitably shaped head 33 for tightening engagement as by a wrench.

By reference to Figure 2 it will be noted that the length of rod 26 is such that the cooperative surfaces 23—14 and 28—29 will simultaneously engage each other. Member 17 may be independently adjusted with respect to its nut until the normal possible clearance is just sufficient to allow sliding of the flange beneath clamp 14 on rotation of the table. A lock nut 34 is then preferably engaged on the lower end of member 17 to secure nut 18 in position thereon.

The parts having been thus adjusted, turning of clamp bolt 32 will draw nut 30 toward the table. This action causes faces 28 and 29 to ride against each other and cam or wedge lock bar 26 toward the right as indicated in Figure 2. This tightening action will draw wedge surface 24 tightly against inclined surface 23, the yoke 25 wedging or forcing this nut downward with respect to the table and tightening the left hand clamp 14. It will thus be seen that the action of the two clamps will be substantially equal and that tightening of the member 32 will therefore cause a clamping pressure to be exerted by the clamps at the two ends of the table and secure the table any desired angularly adjusted position. It might be mentioned that this is of prime importance in machine tool mechanisms such as that here illustrated for example, since same is designed to produce work accurate to within a fraction of a thousandth of an inch and any failure to properly clamp, not only one but both ends of the table, leaves an opportunity for either slipping or even springing of the unclamped portion sufficient to materially affect the accuracy of the resultant product.

In this connection it is to be understood that while, for convenience of illustration, I have shown the bar 26 as a single member, the same may be of forked or Y shape or other variation designed to equalize the clamping action of three or more clamps in place of but two,—the idea of the invention being that of the wedge tightening of the plurality of clamps by adjustment of a single clamping device.

I claim:

1. In a machine tool assembly, the combination with a pair of relatively adjustable members of clamps for securing the members in relatively adjusted position, means for securing the clamps including nut and bolt members therefor, the nut portions having oppositely disposed inclined surfaces which converge in the direction of the table, and an equalizer connecting the nut members and having wedge faces co-acting with the inclined portions of the nuts, whereby tightening of one of the bolts of one of the clamp members will, thru the bar and adjacent wedge, draw the other wedge against the opposite nut and bolt.

2. In mechanism of the character described, a pair of relatively adjustable parts, clamps therefor, locking devices for the clamps including bolt members, nuts on the bolt members having laterally extending beveled wings, the nuts of opposed clamp members being oppositely disposed, connecting member slidably mounted intermediate said nuts, and inwardly tapering wedges carried by said connecting member exteriorly of and for coaction with the inclined wings of the nuts, substantially as and for the purpose described.

3. In a grinding machine the combination with a bed, of a table slidable upon the bed, a second table pivotally mounted for angular adjustment upon the sliding table, and means for securing the two tables in desired adjusted position relative to each other, said means including oppositely disposed clamp members, screw devices depending through the clamp members and sliding table, nut members engaged on the lower ends of the screw members for engagement with the underside of the table, whereby the clamps may be individually tightened by rotation of the screw members, said nuts having laterally extending wing portions inwardly bevelled at an acute angle to the underface of the sliding table, and a draw-bar member intermediate the nuts having yoke portions spanning the nut and formed with inclined surfaces for engaging the outer incline faces of the wings on the nuts, whereby tightening of one of the nuts will cause its inclined wings to laterally shift the engaged yoke and exert a tension against the yoke at the opposite end, bringing it into wedging engagement with the inclined wings of the second nut member.

In testimony whereof I hereunto set my hand this 30th day of September, 1924, at Cincinnati, Ohio.

ALBERT TURNER.

CERTIFICATE OF CORRECTION.

Patent No. 1,612,774.

Granted December 28, 1926, to

ALBERT TURNER.

It is hereby certified that the above numbered patent was erroneously issued to "The Cincinnati Milling Machine Company", whereas said Letters Patent should have been issued to "Cincinnati Grinders Incorporated", Cincinnati, Ohio, a Corporation of Ohio, said corporation being assignee by mesne assignments of the entire interest in said invention, as shown by the records of assignments in this office; and that the said Letters Patent should be read with this correction therein that the same may conform to the record of the case in the Patent Office.

Signed and sealed this 12th day of April, A. D. 1927.

Seal.

M. J. Moore,
Acting Commissioner of Patents.